US010435333B2

(12) United States Patent
Ortiz-Suarez et al.

(10) Patent No.: US 10,435,333 B2
(45) Date of Patent: Oct. 8, 2019

(54) HIGH TEMPERATURE AMINE-STABILIZED DCD AND/OR ALKYL THIOPHOSPHORIC TRIAMIDE SOLVENT SYSTEMS AND USE IN AGRICULTURAL APPLICATIONS

(71) Applicant: RHODIA OPERATIONS, Paris (FR)

(72) Inventors: Marivi Ortiz-Suarez, Burlington, NJ (US); James Sawyer, Yardley, PA (US); Christopher Harris, Worcester (GB)

(73) Assignee: RHODIA OPERATIONS, Paris (FR)

(*) Notice: Subject to any disclaimer, the term of this patent is extended or adjusted under 35 U.S.C. 154(b) by 0 days.

(21) Appl. No.: 15/239,215

(22) Filed: Aug. 17, 2016

(65) Prior Publication Data

US 2017/0050895 A1   Feb. 23, 2017

Related U.S. Application Data

(60) Provisional application No. 62/205,837, filed on Aug. 17, 2015.

(51) Int. Cl.
| | |
|---|---|
| *C09K 15/18* | (2006.01) |
| *C05G 3/08* | (2006.01) |
| *C05G 3/00* | (2006.01) |
| *C05C 11/00* | (2006.01) |
| *C05C 9/00* | (2006.01) |

(52) U.S. Cl.
CPC ............ *C05G 3/08* (2013.01); *C05C 9/00* (2013.01); *C05C 11/00* (2013.01); *C05G 3/0064* (2013.01); *C09K 15/18* (2013.01); *Y02P 60/218* (2015.11)

(58) Field of Classification Search
None
See application file for complete search history.

(56) References Cited

U.S. PATENT DOCUMENTS

| | | |
|---|---|---|
| 3,152,039 A | 10/1964 | Mattson |
| 3,353,949 A | 11/1967 | Nau |
| 3,425,819 A | 2/1969 | Barry et al. |
| 3,986,859 A | 10/1976 | Molinet |
| 4,530,714 A | 7/1985 | Kolc et al. |
| 4,943,307 A | 7/1990 | Detre et al. |
| 5,024,689 A | 6/1991 | Sutton et al. |
| 5,071,463 A | 12/1991 | Narayanan et al. |

(Continued)

FOREIGN PATENT DOCUMENTS

| | | |
|---|---|---|
| CN | 1417172 A | 5/2003 |
| CN | 101108781 A | 1/2008 |

(Continued)

OTHER PUBLICATIONS

Santa Cruz Biotechnology, Product Page for NBPT; CAS #94317-64-3 Data Sheet.

(Continued)

*Primary Examiner* — Wayne A Langel
(74) *Attorney, Agent, or Firm* — Vorys, Sater, Seymour and Pease LLP

(57) ABSTRACT

An inhibitor composition contains alkyl thiophosphoric triamide (or a mixture of alkyl thiophosphoric triamide and dicyandiamide), dissolved in a liquid medium comprising at least one organic solvent and at least one amine stabilizer, is useful in making fertilizer compositions and in a method of fertilizing target plants.

19 Claims, 3 Drawing Sheets

(56) References Cited

U.S. PATENT DOCUMENTS

| | | | |
|---|---|---|---|
| 5,160,528 A | 11/1992 | Chaudhuri et al. | |
| 5,352,265 A | 10/1994 | Weston et al. | |
| 5,364,438 A | 11/1994 | Weston et al. | |
| 5,435,821 A | 7/1995 | Duvdevani et al. | |
| 5,698,003 A | 12/1997 | Omilinsky et al. | |
| 5,770,771 A | 6/1998 | Sulzer et al. | |
| 5,883,297 A | 3/1999 | Sulzer et al. | |
| 6,262,183 B1 | 7/2001 | Domb et al. | |
| 6,830,603 B2 | 12/2004 | Whitehurst et al. | |
| 8,048,189 B2 * | 11/2011 | Whitehurst | C05B 17/00 564/12 |
| 8,133,294 B2 | 3/2012 | Whitehurst et al. | |
| 8,163,058 B2 | 4/2012 | Whitehurst et al. | |
| 8,603,211 B2 | 12/2013 | Rahn et al. | |
| 9,096,476 B2 | 8/2015 | Roberts | |
| 2003/0211943 A1 | 11/2003 | Harwell | |
| 2004/0163434 A1 | 8/2004 | Quin | |
| 2006/0185411 A1 | 8/2006 | Hojjatie et al. | |
| 2007/0077428 A1 | 4/2007 | Hamed et al. | |
| 2007/0157689 A1 | 7/2007 | Sutton et al. | |
| 2007/0295047 A1 | 12/2007 | Sutton | |
| 2010/0206030 A1 | 8/2010 | Whitehurst et al. | |
| 2010/0206031 A1 | 8/2010 | Whitehurst et al. | |
| 2010/0218575 A1 | 9/2010 | Wissemeier et al. | |
| 2011/0113842 A1 | 5/2011 | Urrutia et al. | |
| 2011/0154874 A1 | 6/2011 | Rahn et al. | |
| 2011/0196172 A1 | 8/2011 | Kysilka et al. | |
| 2011/0233474 A1 | 9/2011 | Cigler | |
| 2011/0259068 A1 | 10/2011 | Whitehurst et al. | |
| 2011/0314883 A1 | 12/2011 | Whitehurst et al. | |
| 2012/0148752 A1 | 6/2012 | Lambeth et al. | |
| 2013/0145806 A1 | 6/2013 | Iannotta et al. | |
| 2013/0276495 A1 | 10/2013 | Sutton et al. | |
| 2014/0037570 A1 | 2/2014 | Whitehurst et al. | |
| 2014/0047881 A1 | 2/2014 | Roberts | |
| 2014/0047884 A1 | 2/2014 | Gabrielson et al. | |
| 2014/0060132 A1 | 3/2014 | Roberts | |
| 2014/0090432 A1 | 4/2014 | McKnight et al. | |
| 2014/0174140 A1 | 6/2014 | Ortiz-Suarez et al. | |
| 2014/0326030 A1 | 11/2014 | Phillip et al. | |
| 2015/0031786 A1 | 1/2015 | Lambeth | |
| 2015/0143860 A1 | 5/2015 | McKnight et al. | |
| 2016/0107947 A1 * | 4/2016 | McKnight | C05G 3/08 71/27 |

FOREIGN PATENT DOCUMENTS

| | | |
|---|---|---|
| CN | 101200400 B | 6/2008 |
| CN | 101328097 A | 12/2008 |
| CN | 101723752 A | 6/2010 |
| CN | 102746073 A | 10/2012 |
| CN | 104671999 A | 6/2015 |
| EP | 0869933 B1 | 6/2009 |
| EP | 2266400 A1 | 12/2010 |
| EP | 2032589 B1 | 9/2011 |
| GB | 960109 | 6/1964 |
| WO | 9722568 | 6/1997 |
| WO | 2008000196 A1 | 1/2008 |
| WO | 2009021986 A1 | 2/2009 |
| WO | 2009021986 A8 | 2/2009 |
| WO | 2010072184 A2 | 7/2010 |
| WO | 2010096266 A1 | 8/2010 |
| WO | 2014036278 A1 | 3/2014 |
| WO | 2014100561 A1 | 6/2014 |
| WO | 2015001457 A3 | 1/2015 |
| WO | 2015081116 A1 | 6/2015 |
| WO | 2016064973 A1 | 4/2016 |

OTHER PUBLICATIONS

Rick Engel, "Volatilization losses from surface-applied urea during cold weather months", Dec. 13-14, 2011, Manitoba Agronomist Conference, Winnipeg, Manitoba.

Arkema announces its new DMSO website at www.arkema.com/dmso, 1 page, Nov. 24, 2008, http://www.arkema.com/en/media/news/news-details/Arkema-announces-its-new-DMSO-website-at-www-arkema.com-dmso/.

Supplementary European Search Report dated Feb. 28, 2019 for EP16837740 to Rhodia Operations.

* cited by examiner

HIGH TEMPERATURE AMINE-STABILIZED DCD AND/OR ALKYL THIOPHOSPHORIC TRIAMIDE SOLVENT SYSTEMS AND USE IN AGRICULTURAL APPLICATIONS

CROSS-REFERENCE TO RELATED APPLICATIONS

This application claims the benefit of U.S. Provisional Patent Application No. 62/205,837 filed Aug. 17, 2015, incorporated herein by reference in its entirety.

FIELD OF THE INVENTION

This invention relates to liquid compositions comprising dicyandiamide and/or an alkyl thiophosphoric triamide, methods for stabilizing such liquid compositions at high temperatures by incorporating an amine stabilizer, and the use of such compositions.

BACKGROUND OF THE INVENTION

In the agrochemical industry, farmers use various fertilizers to impart macronutrients to plants either by application to the soil or application to plant leaves. Nitrogen, phosphorus, potassium, calcium, magnesium, and sulfur are macronutrients that must be supplied to the plants and soil manually by farmers. In many crops, the amount of nitrogen supplied is critical to the overall quality and growth of the crop. Nitrogen is typically supplied in the form of nitrogenous, i.e., nitrogen precursor-containing, fertilizer compounds, such as urea, ammonium nitrate, or ammonium phosphate fertilizer compounds. Due to the high water solubility of these salts, however, applied nitrogen values may be lost due to run-off and leaching of the nitrogenous fertilizer compounds. Once applied, the nitrogenous fertilizer compounds are typically degraded, for example, by microorganisms present in the soil, to nitrogenous species such as $NH_4^+$, $NO_2^-$, $NO_3^-$, and ammonia gas, that may be even more readily lost through evaporation, run-off, and leaching than the fertilizer compounds themselves. If degradation of the fertilizer compounds occurs at a rate that is faster than the nitrogenous degradation products can be used by the plants, then the nitrogen values in the degradation products are at increased risk of being lost.

Nitrification and/or urease inhibitors are of potential use in delaying degradation of fertilizer compounds and thereby reducing losses of nitrogenous degradation products that would otherwise occurred in the absence of the inhibitors. The use of nitrification and/or urease inhibitors in combination with nitrogenous fertilizer compounds tends to increase the amount of time the nitrogen source remains in the soil and available for absorption by the plants, which tends to increase the effectiveness of the fertilizer and positively impact crop yield and quality.

Aqueous end use fertilizer solutions are typically prepared in the field by diluting commercially available concentrated fertilizer compositions with water. Commonly used concentrated fertilizer compositions include concentrated ammonium nitrate compositions, such as, for example, UAN 18, UAN 28, UAN 30 and UAN 32.

Dicyandiamide is potentially useful as a nitrification inhibitor in such aqueous end use fertilizer compositions, but has very low solubility (about 41 grams per liter ("g/l")) in water and so is difficult to incorporate into the aqueous end use fertilizer compositions, particularly under field conditions

SUMMARY OF THE INVENTION

Urease inhibitors can be used with a fertilizer (i.e., incorporated into a urea-containing fertilizer, e.g., urea and urea ammonium nitrate (UAN)) to slow the conversion of ammonium to ammonia gas and thus slow the loss of ammonia to volatilization, thus making ammonium available to plants in the soil for longer periods of time. In many crops, the amount of nitrogen supplied is critical to the overall quality and growth of the crop. Nitrogen is supplied in either urea or ammonium phosphate forms. Due to the high water solubility of these salts, however, much of the nitrogen applied is lost to run-off and leaching. In ammonium-based products, if the nitrogen is not lost to leaching or run-off, it is being converted to ammonia gas by an enzyme called urease where the ammonia can bind to soil particles. Conversion occurring near the surface of the soil, however, does not allow for binding and this ammonia is lost to the atmosphere. Urease inhibitors are used to protect a farmer's investment in fertilizers by preventing the breakdown of urea by urease, the soil microbe responsible for converting urea to usable ammonia in the soil. This increases the amount of time the nitrogen remains in the soil and is available to the plant for absorption.

Similarly, nitrification inhibitors can be used with a fertilizer (i.e., incorporated into a urea-containing fertilizer, e.g., urea and urea ammonium nitrate (UAN)) to slow the process of ammonium conversion to nitrate, and subsequently the loss of nitrate to leeching, thus making ammonium available to plants in the soil for longer periods of time. Ammonium is one of the main forms of nitrogen that can be utilized by plants. Increasing the amount of time that the nitrogen is available to the plant increases the effectiveness of the fertilizer which positively impacts crop yield and quality.

Fertilizers, in one embodiment, are common water soluble inorganic fertilizers that provide nutrients such as phosphorus-based, nitrogen-based, potassium-based or sulphur-based fertilizers. Examples of such fertilizers include: for nitrogen as the nutrient: nitrates and or ammonium salts such as ammonium nitrate, including in combination with urea e.g. as Uram type materials, calcium ammonium nitrate, ammonium sulphate nitrate, ammonium phosphates, particularly mono-ammonium phosphate, di-ammonium phosphate and ammonium polyphosphate, ammonium sulphate, and the less commonly used calcium nitrate, sodium nitrate, potassium nitrate and ammonium chloride. It is understood that a fertilizer composition can comprise one or a combination of the fertilizers described herein.

A typical urease inhibitor, alkyl thiophosphoric triamide (for example, N-(n-butyl)-thiophosphoric triamide or otherwise "NBPT"), however, faces drawbacks in its use as NBPT is extremely difficult to handle. NBPT is a sticky, waxy, heat and water sensitive material, which cannot be used in its solid form, as it is used at low concentrations making it difficult to evenly distribute on urea prills (i.e., large granules) and in soil. In order to evenly distribute the NBPT onto the urea, the NBPT should be dispersed into a carrier prior to being sprayed onto the urea. Thus, the use of a solvent system containing the NBPT is desirable as, in its liquid form, the solvent system is capable of distributing the NBPT into granular urea (e.g., urea prills) and into liquid fertilizers containing urea. By introducing the NBPT to liquid fertilizers containing urea (for example, urea-ammonium nitrate solutions or UAN) in a solvent system, the NBPT is capable of being better dispersed in the liquid fertilizer.

Dicyandiamide is useful as a nitrification inhibitor in aqueous agricultural applications, e.g., end use fertilizer compositions, but similar to urease inhibitors face similar drawbacks. Nitrification inhibitors, such as dicyandiamide, generally have very low solubility (about 41 grams per liter ("g/l")) in water and so it is difficult to incorporate into the aqueous end use fertilizer compositions, particularly under field conditions. As nitrification inhibitors, such as dicyandiamide, have a generally low solubility, they are used at low concentrations in water making it difficult to evenly distribute on urea-containing prills (i.e., large granules) and in soil. In order to evenly distribute the dicyandiamide onto the urea-containing prills or granules, dicyandiamide should be dispersed into a solvent carrier prior to being sprayed onto the urea. Thus, the use of a solvent system containing dicyandiamide (herein, also termed "DCD") is desirable as, in its liquid form, the solvent system is capable of distributing the dicyandiamide onto urea granules or prills, urea ammonium nitrate granules or prills or, otherwise, urea-containing granules or prills, and into liquid fertilizers containing urea or urea ammonium nitrate. By introducing the dicyandiamide to liquid fertilizers containing urea (for example, urea-ammonium nitrate solutions or UAN) in a solvent system, the dicyandiamide is capable of being better dispersed in the liquid fertilizer.

In one embodiment, concentrated fertilizer compositions include concentrated ammonium nitrate compositions, such as, for example, UAN 18, UAN 28, UAN 30 and UAN 32.

Thus, it is desirable to have a solvent system containing alkyl thiophosphoric triamide, and in particular, (N-(n-butyl)-thiophosphoric triamide), that has a favorable toxicological and/or ecological profile and desirable characteristics in terms of low volatility, biodegradability or ready biodegradability (i.e., readily biodegradable), low toxicity or low hazard level. It is desirable to have a solvent system containing dicyandiamide, that has a favorable toxicological and/or ecological profile and desirable characteristics in terms of low volatility, biodegradability or ready biodegradability (i.e., readily biodegradable), low toxicity or low hazard level. It is also desirable to have a solvent system containing a combination of dicyandiamide and an alkyl thiophosphoric triamide, in particular, (N-(n-butyl)-thiophosphoric triamide), that has a favorable toxicological and/or ecological profile and desirable characteristics in terms of low volatility, biodegradability or ready biodegradability (i.e., readily biodegradable), low toxicity or low hazard level.

Another problem is that certain nitrification inhibitors and/or urease inhibitors degrade at high temperatures. For example, NBPT—a urease inhibitor—degrades rapidly at higher temperature, typically, above 45° C. Often times temperatures in agricultural fields (e.g., corn fields, wheat fields, etc.) reach in excess of 35° C. and sometimes can reach up to 45° C. or higher. For example, at 45° C. NBPT formulated in different solvents changes color in days from colorless to a darker green/brown, followed by sludge/precipitate formation after weeks had been exposed to high heat. Thus, it is also desirable to have solvent systems containing nitrification inhibitors and/or urease inhibitors that are stabilized at high temperatures, such as those unitized in hot climates or weather. This invention addresses the addition of stabilizers to prolong the chemical and physical stability of formulated liquid agricultural compositions containing (i) one or more nitrification inhibitors, (ii) one or more urease inhibitors or (iii) a combination of both (i) and (ii). In one embodiment, the urease inhibitor is NBPT.

The present invention described herein will become apparent from the following detailed description and examples, which comprises in one aspect, a liquid composition for use in agricultural applications comprising: at least one of a nitrification inhibitor or a urease inhibitor; at least one solvent; and at least one amine stabilizer.

In one embodiment, the amine stabilizer is an alkanolamine. In another embodiment, the amine stabilizer is a monoalkanolamine. In another embodiment, the amine stabilizer is a dialkanolamine. In another embodiment, the amine stabilizer is a trialkanolamine. In yet another embodiment, the amine stabilizer is a monoethanolamine. In a further embodiment, the amine stabilizer is a diethanolamine. In yet a further embodiment, the amine stabilizer is a triethanolamine. In another embodiment, the alkanol group is chosen from methanol, ethanol, propanol, butanol.

In another aspect, described herein are methods of making a solid or concentrated liquid fertilizer compositions comprising treating (e.g., contacting or spray applying) one or more nitrogenous fertilizer compounds with a liquid inhibitor composition. The liquid inhibitor composition comprises at least one of a nitrification inhibitor or a urease inhibitor, homogenously dissolved or dispersed in a solvent comprising at least one amine stabilizer as described above. The liquid inhibitor composition, in one embodiment, further comprises at least one organic co-solvent selected from polar aprotic solvents, amine solvents, heterocyclic alcohol solvents, and mixtures thereof.

The term treating, in one embodiment, includes spray applying the liquid inhibitor composition with the one or more nitrogenous fertilizer compounds. The term treating, in one embodiment, includes but is not limited to contacting the inhibitor composition with the one or more nitrogenous fertilizer compounds. In one embodiment, the nitrification inhibitor is dicyandiamide. In another embodiment, the urease inhibitor is an alkyl thiophosphoric triamide.

In yet another aspect, described herein are concentrated liquid fertilizer compositions comprising, based on weight of the composition: (a) up to about 99 wt %, by weight of composition, of one or more nitrogenous fertilizer compounds, (b) at least one alkyl thiophosphoric triamide or an alkyl thiophosphoric triamide in combination with dicyandiamide, (c) a solvent as described herein and (d) an amine stabilizer.

In a further aspect, described herein are concentrated liquid fertilizer compositions comprising, based on weight of the composition: (a) up to about 99 wt %, by weight of composition, of one or more nitrogenous fertilizer compounds, (b) at least one of a dicyandiamide or an alkyl thiophosphoric triamide, (c) optionally, at least one organophosphate compound according to formula (I.a), (d) at least one solvent selected from polar aprotic solvents, heterocyclic alcohol solvents, and mixtures thereof, (e) an amine stabilizer and (f) optionally, water. The concentrated liquid fertilizer compositions can further comprise one or more stabilizers.

In yet another aspect, described herein are solid or substantially solid fertilizer compositions comprising: (a) solid particles of one or more nitrogenous fertilizer compounds, and (b) an inhibitor composition comprising at least one of a dicyandiamide or an alkyl thiophosphoric triamide supported on at least a portion of the solid particles.

In another aspect, described herein are methods of making a high temperature stable liquid or aqueous fertilizer composition comprising contacting one or more nitrogenous fertilizer compounds, with a liquid inhibitor composition that comprises at least one of a nitrification inhibitor or a urease inhibitor, homogenously dissolved or dispersed in a solvent comprising an amine stabilizer. In one typical embodiment, the amine stabilizer is monoethanolamine.

The solvent can, optionally, further comprise an organic co-solvent selected from polar aprotic solvents, amine solvents, heterocyclic alcohol solvents, and mixtures thereof.

In another aspect, the organophosphate compound has the formula (I.a)

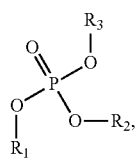

(I.a)

wherein $R_1$, $R_2$ and $R_3$, are each independently chosen from H, a $C_1$-$C_{16}$ alkyl group, a $C_1$-$C_{16}$ alkenyl, group, a $C_1$-$C_{16}$ alkoxyalkyl group, a $C_7$-$C_{30}$ alkylarylalkyl group, a $C_7$-$C_{30}$ arylalkyl group, or an aryl group; provided that at least one of $R_1$, $R_2$ or $R_3$ is not H. In another embodiment, $R_1$, $R_2$ and $R_3$, are each independently chosen from H, a $C_1$-$C_{12}$ alkyl group, a $C_1$-$C_{12}$ alkenyl, group, a $C_1$-$C_{12}$ alkoxyalkyl group, a $C_7$-$C_{30}$ alkylarylalkyl group, a $C_7$-$C_{30}$ arylalkyl group, or an aryl group; provided that at least one of $R_1$, $R_2$ or $R_3$ is not H. In one embodiment, $R_1$, $R_2$ and $R_3$, are each independently chosen from H, a $C_1$-$C_4$ alkyl group, a $C_4$-$C_8$ alkyl group, a $C_1$-$C_{12}$ alkenyl, group, a $C_1$-$C_4$ alkoxyalkyl group, a $C_7$-$C_{30}$ alkylarylalkyl group, a $C_7$-$C_{30}$ arylalkyl group, or an aryl group; provided that at least one of $R_1$, $R_2$ or $R_3$ is not H.

In yet another embodiment, $R_1$, $R_2$ and $R_3$, are each independently chosen from a $C_1$-$C_{12}$ alkyl group, a $C_1$-$C_{12}$ alkenyl, group, a $C_1$-$C_{12}$ alkoxyalkyl group, a $C_7$-$C_{30}$ alkylarylalkyl group, a $C_7$-$C_{30}$ arylalkyl group, or an aryl group. In one embodiment, $R_1$, $R_2$ and $R_3$, are each independently chosen from a $C_1$-$C_{12}$ alkyl group, more typically, a $C_2$-$C_8$ alkyl group.

In another aspect, described herein are methods for fertilizing target plants, comprising applying an aqueous end use fertilizer composition that comprises: (a) one or more nitrogenous fertilizer compounds, (b) at least one of a dicyandiamide or an alkyl thiophosphoric triamide, typically, alkyl thiophosphoric triamide, (c) at least one solvent comprising dimethyl sulfoxide, dimethyl formamide, the dimethyl ester of succinic acid, dimethyl ester of ethyl succinic acid, the dimethyl ester of glutaric acid, the dimethyl ester of methyl glutaric acid, and the dimethyl ester of adipic acid, diethylene triamine, or monoethanolamine, methyl-5-(dimethylamino)-2-methyl-oxopentanoate, dimethylaminoethanol, triethanol amine, a heterocyclic alcohol according to formula (II.a):

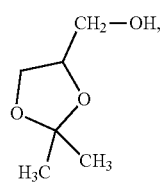

(II.a)

or mixtures thereof, (d) an amine stabilizer, and optionally, (e) water, to the target plants or to an environment for the target plants. It is understood that the term heterocyclic alcohol includes dioxolane compounds. The end use fertilizer composition can also comprise, in some embodiments, at least one stabilizer other than an amine stabilizer, which in one embodiment is an organophosphate compound.

In one embodiment, the alkyl thiophosphoric triamide is N-(n-butyl)-thiophosphoric triamide. In another embodiment, the liquid composition comprises at least one solvent selected from the group consisting of: (a) at least one dioxolane compound of formula (II.b):

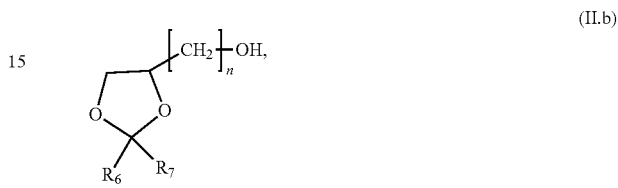

(II.b)

wherein $R_6$ and $R_7$ individually comprises a hydrogen, an alkyl group, an alkenyl group, or a phenyl group, wherein n is an integer of from 1 to 10; b) at least one dibasic ester; c) at least one compound of formula (II.b):

$$R_3OOC\text{-}A\text{-}CONR_4R_5 \quad (III),$$

wherein $R_3$ comprises a $C_1$-$C_{36}$ alkyl group; wherein $R_4$ and $R_5$ individually comprise a $C_1$-$C_{36}$ alkyl group, wherein $R_4$ and $R_5$ can optionally together form a ring; and wherein A is a linear or a branched divalent $C_2$-$C_6$ alkyl group; d) at least one alkyldimethylamide; e) at least one alkyl lactate; f) ethyl levulinate; g) at least one alkyoxyalcohol, ether alcohol, amine alcohol, amino alcohol or alcohol; h) at least one glycerine or glycerine derivative; i) at least one alkylene carbonate; j) dimethylsulfoxide; and k) any combination thereof. In one embodiment, the organic solvent is dimethylsulfoxide.

In another aspect, the present invention is directed to a nitrification inhibitor composition comprising dicyandiamide dissolved in a liquid medium that comprises an organic solvent selected from polar aprotic solvents, dibasic esters, amines, amino alcohols, heterocyclic alcohols, and mixtures thereof.

In yet another aspect, the present invention is directed to a method of making a solid or concentrated liquid fertilizer composition comprising treating (e.g., contacting, spray applying, brushing, etc) one or more nitrogenous fertilizer compounds with a nitrification inhibitor composition that comprises dicyandiamide dissolved in a liquid medium that comprises an organic solvent selected from polar aprotic solvents, amine solvents, heterocyclic alcohol solvents, and mixtures thereof.

In a further aspect, the present invention is directed to a concentrated liquid fertilizer composition comprising, by weight of the composition:
(a) up to about 99 wt % of one or more nitrogenous fertilizer compounds,
(b) an alkyl thiophosphoric triamide or, less typically, a dicyandiamide (or a combination thereof);
(c) at least one amine stabilizer as described above (which, in one embodiment, is monoethanolamine);
(d) at least one solvent selected from polar aprotic solvents, amine solvents, heterocyclic alcohol solvents, or mixtures thereof, and
(d) optionally, water.

In another aspect, the present invention is directed to a concentrated solid fertilizer composition comprising:
(a) solid particles of one or more nitrogenous fertilizer compounds, and
(b) dicyandiamide or an alkyl thiophosphoric triamide supported on at least a portion of the solid particles.

In one embodiment, the carrier utilized to contact the dicyandiamide or an alkyl thiophosphoric triamide with the solid particles comprises at least one solvent as described herein and an amine stabilizer as described herein.

In yet another aspect, the present invention is directed to a method of making an high temperature stable, aqueous end use fertilizer composition comprising contacting one or more nitrogenous fertilizer compounds with a urease inhibitor composition that comprises an alkyl thiophosphoric triamide dissolved in a liquid medium that comprises an organic solvent selected from polar aprotic solvents, amine solvents, heterocyclic alcohol solvents, or mixtures thereof, in addition to an amine stabilizer. In one embodiment, the amine stabilizer in monoethanolamine. In another embodiment, the amine stabilizer is diethanolamine. In yet another embodiment, the amine stabilizer is triethanolamine.

In a further aspect, the present invention is directed to a method for fertilizing target plants, comprising applying an aqueous end use fertilizer composition that comprises:
(a) one or more nitrogenous fertilizer compounds;
(b) dicyandiamide, an alkyl thiophosphoric triamide, or a mixture thereof;
(c) an amine stabilizer (which is, in on embodiment, monoethanolamine),
(d) at least one organic solvent selected from dimethyl sulfoxide, dimethyl formamide, the dimethyl ester of succinic acid, dimethyl ester of ethyl succinic acid, the dimethyl ester of glutaric acid, the dimethyl ester of methyl glutaric acid, and the dimethyl ester of adipic acid, diethylene triamine, or monoethanolamine, methyl-5-(dimethylamino)-2-methyl-oxopentanoate, dimethylaminoethanol, triethanol amine, a heterocyclic alcohol according to formula (II.a):

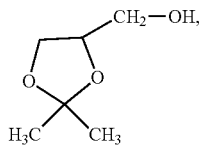

(II.a)

Or mixtures thereof; and
(e) optionally, water,
to the target plants or to an environment for the target plants.

DETAILED DESCRIPTION

Figure 1:
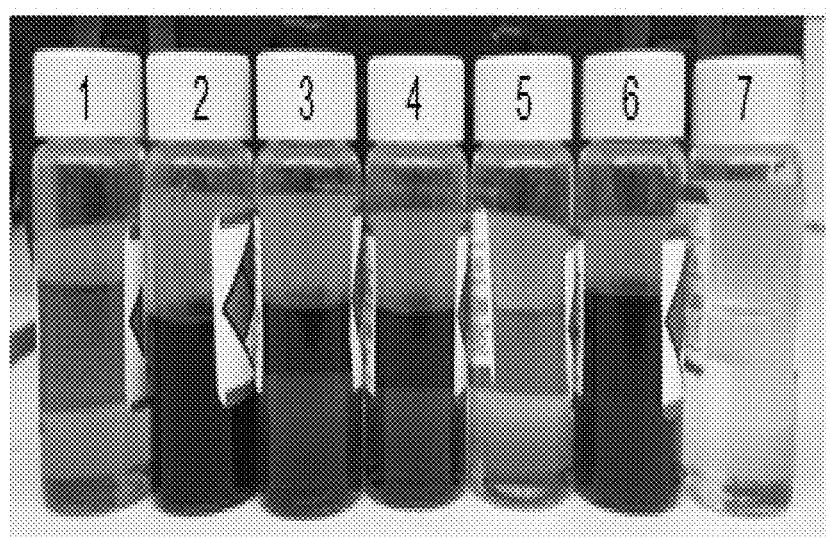
FIG. 1 is a photograph of Several amines or amides were tested to check if they can stabilize NBPT degradation at high temperatures (at greater than 45° C.) in NBPT/DMSO formulation. Each sample was prepared with 2% of amine stabilizer added.

As used herein, the term "alkyl" means a saturated straight chain, branched chain, or cyclic hydrocarbon radical, including but not limited to, methyl, ethyl, n-propyl, iso-propyl, n-butyl, sec-butyl, t-butyl, pentyl, n-hexyl, and cyclohexyl.

As used herein, the term "aryl" means a monovalent unsaturated hydrocarbon radical containing one or more six-membered carbon rings in which the unsaturation may be represented by three conjugated double bonds, which may be substituted one or more of carbons of the ring with hydroxy, alkyl, alkenyl, halo, haloalkyl, or amino, including but not limited to, phenoxy, phenyl, methylphenyl, dimethylphenyl, trimethylphenyl, chlorophenyl, trichloromethylphenyl, aminophenyl, and tristyrylphenyl.

As used herein, the term "alkylene" means a divalent saturated straight or branched chain hydrocarbon radical, such as for example, methylene, dimethylene, trimethylene.

As used herein, the term "alkoxyl" means an oxy radical that is substituted with an alkyl group, such as for example, methoxyl, ethoxyl, propoxyl, isopropoxyl, or butoxyl, which may optionally be further substituted on one or more of the carbon atoms of the radical.

As used herein, the term "alkoxyalkyl" means an alkyl radical that is substituted with one or more alkoxy substituents, more typically a $(C_1-C_{22})$alkyloxy-$(C_1-C_6)$alkyl radical, such as methoxymethyl, and ethoxybutyl.

As used herein, the term "alkenyl" means an unsaturated straight or branched hydrocarbon radical, more typically an unsaturated straight, branched, (which, in one particular embodiment, is $C_1-C_{75}$) hydrocarbon radical, that contains one or more carbon-carbon double bonds, such as, for example, ethenyl, n-propenyl, iso-propenyl.

As used herein, the term "arylalkyl" means an alkyl group substituted with one or more aryl groups, more typically a $(C_1-C_{18})$alkyl substituted with one or more $(C_6-C_{14})$aryl substituents, such as, for example, phenylmethyl, phenylethyl, and triphenylmethyl.

As used herein, the term "aryloxy" means an oxy radical substituted with an aryl group, such as for example, phenyloxy, methylphenyl oxy, isopropylmethylphenyloxy.

As used herein, the terminology "$(C_r-C_s)$" in reference to an organic group, wherein r and s are each integers, indicates that the group may contain from r carbon atoms to s carbon atoms per group.

Dicyandiamide is a known compound according to formula (I.b):

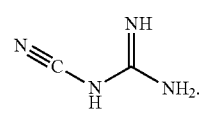

(I.b)

Dicyandiamide, also known as "2-cyanoguanidine", is typically made by treating cyanamide with base and is commercially available.

In one embodiment, the compositions according to the present invention comprise a urease inhibitor, such as an alkyl thiophosphoric triamide or ammonium thiosulfate, a nitrification inhibitor, or a combination of both a urease inhibitor and a nitrification inhibitor.

In one embodiment, alkyl thiophosphoric triamide is N-(n-butyl)-thiophosphoric triamide ("NBPT"). The at least one of alkyl thiophosphoric triamide or dicyandiamide or combination thereof can be present in the liquid agricultural composition at a lower range of 2% by weight of the composition. In another embodiment, the at least one of alkyl thiophosphoric triamide or dicyandiamide or combination thereof can be present in the liquid agricultural composition at a lower range of 3% by weight of the composition. The at least one of alkyl thiophosphoric triamide or dicyandiamide or combination thereof can be present in the liquid agricultural composition at a lower range of 5% by weight of the composition.

In another embodiment, at least one of alkyl thiophosphoric triamide and/or dicyandiamide can be present in the liquid agricultural composition at a lower range of 0.5%, or 1%, or 2%, or 3%, or 4%, or 5%, 6%, or 8%, or 10% or 12% or 14%, by weight of the composition. The at least one of alkyl thiophosphoric triamide or dicyandiamide or combination thereof can be present in the liquid agricultural composition at an upper range of 75%, or 65%, or 60% by weight of the composition. In another embodiment, the at least one of alkyl thiophosphoric triamide or dicyandiamide or combination thereof can be present in the liquid agricultural composition at an upper range of 60% by weight of the composition. In another embodiment, the at least one of alkyl thiophosphoric triamide or dicyandiamide or combination thereof can be present in the liquid agricultural composition at an upper range of 55% by weight of the composition. In another embodiment, at least one of alkyl thiophosphoric triamide and/or dicyandiamide can be present in the liquid agricultural composition at an upper range of 59%, or 57%, or 55% or 53% or 50%, by weight of the composition. In another embodiment, at least one of alkyl thiophosphoric triamide and/or dicyandiamide can be present in the liquid agricultural composition at an upper range of 48%, or 46%, or 45% or 42% or 40%, by weight of the composition.

In some embodiments, the dibasic ester or blend of dibasic esters comprises adducts of alcohol and linear diacids, the adducts having the formula (IV):

R—OOC-A-COO—R (IV)

wherein R is an alkyl group (e.g., methyl, ethyl, etc.) and A is a mixture of —(CH2)4-, —(CH2)3, and —(CH2)2-. In other embodiments, the blend comprises adducts of alcohol, typically ethanol, and linear diacids, the adducts having the formula R1-OOC-A-COO—R2, wherein at least part of R1 and/or R2 are residues of at least one linear alcohol having 4 carbon atoms, and/or at least one linear or branched alcohol having at least 5 carbon atoms, and wherein A is a divalent linear hydrocarbon. In some embodiments A is one or a mixture of —(CH2)4-, —(CH2)3, and —(CH2)2-. In other embodiments, the dibasic ester comprises adducts of an alcohol and linear or branched diacids, the adducts having the formula (IV): R—OOC-A-COO—R, wherein R is an alkyl group (e.g., methyl, ethyl, etc.) and A one of the following: —(CH2)4-, —(CH2)3, —(CH2)2-, —CH2-, or any mixture thereof.

Dibasic esters of the present invention may be derived from one or more by-products in the production of polyamide, for example, polyamide 6,6. In one embodiment, the at least one dibasic ester comprises a blend of linear or branched, cyclic or noncyclic, C1-C20 alkyl, aryl, alkylaryl or arylalkyl esters of adipic diacids, glutaric diacids, and succinic diacids. In another embodiment, the composition comprises a blend of linear or branched, cyclic or noncyclic, C1-C20 alkyl, aryl, alkylaryl or arylalkyl esters of adipic diacids, methylglutaric diacids, and ethylsuccinic diacids Generally, polyamide is a copolymer prepared by a condensation reaction formed by reacting a diamine and a dicarboxylic acid. Specifically, polyamide 6,6 is a copolymer prepared by a condensation reaction formed by reacting a diamine, typically hexamethylenediamine, with a dicarboxylic acid, typically adipic acid.

In one embodiment, the blend of dibasic esters can be derived from one or more by-products in the reaction, synthesis and/or production of adipic acid utilized in the production of polyamide, the composition comprising a blend of dialkyl esters of adipic diacids, glutaric diacids, and succinic diacids (herein referred to sometimes as "AGS" or the "AGS blend").

In one embodiment, the blend of esters is derived from by-products in the reaction, synthesis and/or production of hexamethylenediamine utilized in the production of polyamide, typically polyamide 6,6. The composition comprises a blend of dialkyl esters of adipic diacids, methylglutaric diacids, and ethylsuccinic diacids (herein referred to sometimes as "MGA", "MGN", "MGN blend" or "MGA blend").

In certain embodiments, the dibasic ester blend comprises:

a diester of formula (IV.a):

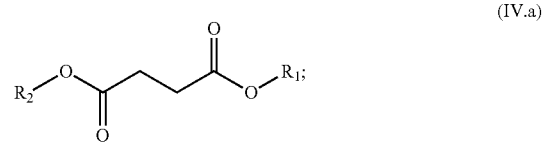

a diester of formula (IV.b):

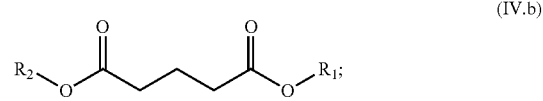

and
a diester of formula (IV.c):

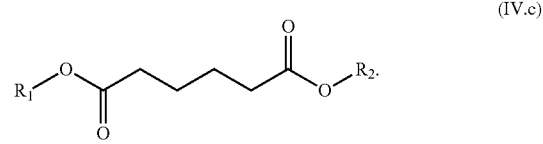

R1 and/or R2 can individually comprise a hydrocarbon having from about 1 to about 8 carbon atoms, typically, methyl, ethyl, propyl, isopropyl, butyl, isobutyl, n-butyl, isoamyl, hexyl, heptyl or octyl. In such embodiments, the blend typically comprises (by weight of the blend) (i) about 15% to about 35% of the diester of formula (IV.a), (ii) about 55% to about 70% of the diester of formula (IV.b), and (iii) about 7% to about 20% of the diester of formula (IV.c), and more typically, (i) about 20% to about 28% of the diester of formula (IV.a), (ii) about 59% to about 67% of the diester of formula (IV.b), and (iii) about 9% to about 17% of the diester of formula (IV.c). The blend is generally characterized by a flash point of 98° C., a vapor pressure at 20° C. of less than about 10 Pa, and a distillation temperature range of about 200-300° C.

In certain other embodiments, the dibasic ester blend comprises:

a diester of the formula (IV.d):

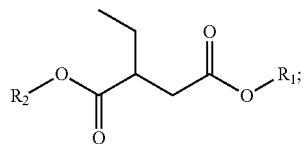

(IV.d)

a diester of the formula (IV.e):

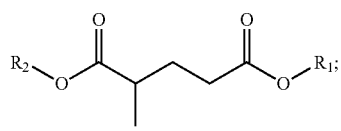

(IV.e)

and, optionally,
a diester of the formula (IV.c):

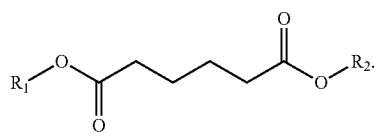

(IV.c)

R1 and/or R2 can individually comprise a hydrocarbon having from about 1 to about 8 carbon atoms, typically, methyl, ethyl, propyl, isopropyl, butyl, isobutyl, n-butyl, isoamyl, hexyl, heptyl, or octyl. In such embodiments, the blend typically comprises (by weight of the blend) (i) from about 5% to about 30% of the diester of formula (IV.d), (ii) from about 70% to about 95% of the diester of formula (IV.e), and (iii) from about 0% to about 10% of the diester of formula (IV.c). More typically, the blend typically comprises (by weight of the blend): (i) from about 6% to about 12% of the diester of formula (IV.d), (ii) from about 86% to about 92% of the diester of formula (IV.e), and (iii) from about 0.5% to about 4% of the diester of formula (IV.c).

Most typically, the blend comprises (by weight of the blend): (i) about 9% of the diester of formula (IV.d), (ii) about 89% of the diester of formula (IV.e), and (iii) about 1% of the diester of formula (IV.c). The blend is generally characterized by a flash point of 98° C., a vapor pressure at 20° C. of less than about 10 Pa, and a distillation temperature range of about 200-275° C.

In another embodiment, the at least one of alkyl thiophosphoric triamide or dicyandiamide or combination thereof can be present in the liquid agricultural composition at an upper range of 70% by weight of the composition. In another embodiment, the at least one of alkyl thiophosphoric triamide or dicyandiamide or combination thereof can be present in the liquid agricultural composition at an upper range of 65% by weight of the composition. In another embodiment, the at least one of alkyl thiophosphoric triamide or dicyandiamide or combination thereof can be present in the liquid agricultural composition at an upper range of 60% by weight of the composition. In another embodiment, the at least one of alkyl thiophosphoric triamide or dicyandiamide or combination thereof can be present in the liquid agricultural composition at an upper range of 55% by weight of the composition. In another embodiment, the at least one of alkyl thiophosphoric triamide or dicyandiamide or combination thereof can be present in the liquid agricultural composition at an upper range of 40% by weight of the composition. In another embodiment, the at least one of alkyl thiophosphoric triamide or dicyandiamide or combination thereof can be present in the liquid agricultural composition at an upper range of 35% by weight of the composition. In another embodiment, the at least one of alkyl thiophosphoric triamide or dicyandiamide or combination thereof can be present in the liquid agricultural composition at an upper range of 30% by weight of the composition. In another embodiment, the at least one of alkyl thiophosphoric triamide or dicyandiamide or combination thereof can be present in the liquid agricultural composition at an upper range of 25% by weight of the composition.

In another embodiment, the at least one of alkyl thiophosphoric triamide or dicyandiamide can be present in the liquid agricultural composition in an amount between about 7% by weight of the composition to about 55% by weight of the composition. In another embodiment, the at least one of alkyl thiophosphoric triamide or dicyandiamide can be present in the composition in an amount between about 8% by weight of the composition to about 50% by weight of the composition. In another embodiment, the at least one of alkyl thiophosphoric triamide or dicyandiamide can be present in the liquid agricultural composition in an amount between about 7% by weight of the composition to about 45% by weight of the composition. In another embodiment, the at least one of alkyl thiophosphoric triamide or dicyandiamide can be present in the liquid agricultural composition in an amount between about 7% by weight of the composition to about 40% by weight of the composition. In another embodiment, the at least one of alkyl thiophosphoric triamide or dicyandiamide can be present in the liquid agricultural composition in an amount between about 7% by weight of the composition to about 35% by weight of the composition.

The at least one of alkyl thiophosphoric triamide or dicyandiamide can be present in the composition in an amount between about 0.5% by weight of the composition and about 60% by weight of the composition or, in another embodiment, can be present in the composition in an amount between about 1% by weight of the composition and about 40% by weight of the composition, and, in another embodiment, can be present in the composition in an amount between about 0.5% by weight of the composition and about 20% by weight of the composition. In one particular embodiment, the at least one of alkyl thiophosphoric triamide or dicyandiamide is present in the composition in an amount between about 1% by weight of the composition and about 30% by weight of the composition. The at least one of alkyl thiophosphoric triamide or dicyandiamide means that alkyl thiophosphoric triamide can be solely present, dicyandiamide can be solely present, or a combination of alkyl thiophosphoric triamide and dicyandiamide is present.

Compounds suitable as the amine stabilizer component of the composition and methods of the present invention are alkanolamines. In another embodiment, the amine stabilizer is a monoalkanolamine. In another embodiment, the amine stabilizer is a dialkanolamine. In another embodiment, the amine stabilizer is a trialkanolamine. In yet another embodiment, the amine stabilizer is a monoethanolamine. In a further embodiment, the amine stabilizer is a diethanolamine. In yet a further embodiment, the amine stabilizer is a triethanolamine. In another embodiment, the alkanol group is chosen from methanol, ethanol, propanol, butanol. The amine stabilizer component forms stable compositions at high temperatures with the nitrification and/or urease inhibitor, which in some embodiments means stability at temperatures ranging from −16° C. to 54° C., in other embodiments, −10° C. to 40° C., in other embodiments, −5° C. to 40° C., in other embodiments, −2° C. to 40° C., or in other embodiments, 0° C. to 40° C.

In another embodiment, compounds suitable as the organic solvent are polar aprotic solvents, heterocyclic alcohol solvents, and/or mixtures thereof, that form liquid, or otherwise stable, compositions with the nitrification and/or urease inhibitor at temperatures at or greater than −16° C., in alternative embodiments, greater than −14° C., in other embodiments, greater than −12° C., in other embodiments, greater than −10° C., in further embodiments, greater than −8° C., in other embodiments, greater than −5° C., in other embodiments, greater than −3° C., in other embodiments, greater than −2° C., in other embodiments, greater than 0° C., in other embodiments, greater than 2° C., in other embodiments, greater than 4° C., in other embodiments, greater than 5° C.

In some embodiments, at high temperature ranges or at greater than a specified temperature (as described herein), the liquid fertilizer composition is stable, meaning the urease and/or nitrification inhibitor(s) do not react with the solvent or solvent component under anticipated manufacturing, storage, and use conditions. In one embodiment, the liquid fertilizer compositions are stable at a temperature greater than 25° C. In one embodiment, the liquid fertilizer compositions are stable at a temperature greater than 27° C. In one embodiment, the liquid fertilizer compositions are stable at a temperature greater than 29° C. In one embodiment, the liquid fertilizer compositions are stable at a temperature greater than 30° C. In one embodiment, the liquid fertilizer compositions are stable at a temperature greater than 32° C. In one embodiment, the liquid fertilizer compositions are stable at a temperature greater than 34° C. In one embodiment, the liquid fertilizer compositions are stable at a temperature greater than 35° C. In one embodiment, the liquid fertilizer compositions are stable at a temperature greater than 37° C. In one embodiment, the liquid fertilizer compositions are stable at a temperature greater than 40° C. In one embodiment, the liquid fertilizer compositions are stable at a temperature greater than 42° C. In one embodiment, the liquid fertilizer compositions are stable at a temperature greater than 44° C. In one embodiment, the liquid fertilizer compositions are stable at a temperature greater than 45° C. In one embodiment, the liquid fertilizer compositions are stable at a temperature greater than 47° C. In one embodiment, the liquid fertilizer compositions are stable at a temperature greater than 50° C.

In one embodiment, at the specified temperature ranges or at greater than a specified temperature (as described herein), the liquid fertilizer composition is stable, meaning the liquid fertilizer composition is or substantially is in one phase, i.e., no visible crystals, no visible precipitation, and/or no visible multiple liquid phases. In another embodiment, the liquid fertilizer composition is stable, meaning the liquid fertilizer composition is or substantially is in one phase and shows little or slight discoloration.

In one embodiment, the liquid fertilizer compositions contains an organophosphate compound according to formula (I.a) (wherein $R_1$, $R_2$ and $R_3$ are as described above).

Suitable polar aprotic organic solvents include, for example, dichloromethane, dimethyl acetamide, dimethyl formamide, dimethyl sulfoxide, ethyl acetate, hexamethylphosphoramide, dimethyl sulfone, sulfolane, 1,3-dimethyl-2-imidazoidinone, 1,3-dimethyl-3,4,5,6-tetrahydro-2(1H)-pyrimidone, methyl acetate, ethyl lactate, methylpyrrolidone, tetrahydrofuran, propylene carbonate, and dibasic ester solvents.

Suitable dibasic ester solvents include, for example, dialkyl esters of dicarboxylic acids, more typically, the di($C_1$-$C_{12}$)alkyl esters of saturated linear or branched ($C_2$-$C_8$)aliphatic carboxylic acids or a mixture thereof. In one embodiment, the dibasic ester component comprises one or more compounds according to formula (III):

wherein:
  A is a divalent linear or branched ($C_2$-$C_8$)aliphatic group, and
  $R^1$, $R^2$, and $R^3$ are each independently ($C_1$-$C_{12}$)alkyl, ($C_1$-$C_{12}$)aryl, ($C_1$-$C_{12}$)alkaryl or ($C_1$-$C_{12}$)arylalkyl, and $R^2$ and $R^3$ may each optionally be substituted with one or more hydroxyl groups.

In one embodiment, the dibasic ester solvent component of the compositions and methods of the present invention comprises one or more dimethyl esters of saturated linear or branched ($C_4$-$C_6$)aliphatic carboxylic acids, such the dimethyl ester of succinic acid, dimethyl ester of ethyl succinic acid, the dimethyl ester of glutaric acid, the dimethyl ester of methyl glutaric acid, and the dimethyl ester of adipic acid, and mixtures thereof. In one embodiment, the dibasic ester component comprises the dimethyl ester of succinic acid, the dimethyl ester of glutaric acid, and, optionally, the dimethyl ester of adipic acid, In another embodiment, the dibasic ester component comprises the dimethyl ester of ethyl succinic acid, the dimethyl ester of methyl glutaric acid, and, optionally, the dimethyl ester of adipic acid.

In one embodiment, the dibasic ester solvent component of the compositions and methods of the present invention comprises one or more dialkyl esters of saturated linear or branched ($C_4$-$C_6$)aliphatic carboxylic acids, such the dialkyl ester of succinic acid, dialkyl ester of ethylsuccinic acid, the dialkyl ester of glutaric acid, the dialkyl ester of methylglutaric acid, and the dialkyl ester of adipic acid, and mixtures thereof. In one embodiment, the dibasic ester component comprises the dialkyl ester of succinic acid, the dialkyl ester of glutaric acid, and, optionally, the dimethyl ester of adipic acid, In another embodiment, the dibasic ester component comprises the dialkyl dimethyl ester of ethylsuccinic acid, the dialkyl ester of methylglutaric acid, and, optionally, the dialkyl ester of adipic acid. Each alkyl group in the dialkyl group, one embodiment, individually comprise a $C_1$-$C_8$ alkyl. In another embodiment, each alkyl group in the dialkyl group, one embodiment, individually comprise a $C_1$-$C_4$ alkyl. In another embodiment, each alkyl group in the dialkyl group, one embodiment, individually comprise a $C_1$-$C_6$ alkyl.

Suitable amine solvents include primary amines, including monoalkylamines, such as propylamine, secondary amines, including dialkyl amines and diaryl amines, such as dimethylamine and diphenylamine, and tertiary amines, such as diethylene triamine and methyl-5-(dimethylamino)-2-methyl-oxopentanoate.

In one embodiment, the amine solvent component of the compositions and methods of the present invention is selected from aliphatic or aromatic primary, secondary, or tertiary amines may optionally further comprise one or more additional functional groups, such as hydroxyalkyl groups, hydroxyl groups, carbonyl groups, or alkyl ester groups, other than one or more amino groups.

In one embodiment, the organic solvent component of the compositions and methods of the present invention comprises an amino alcohol. Compounds suitable as the amino alcohol solvent component of the compositions and methods of the present invention are those compounds that comprise at least one primary, secondary, or tertiary amino moiety per molecule and at least one hydroxyalkyl moiety per molecule, more typically In one embodiment, the amino alcohol is a linear, branched, or cyclic, saturated or unsaturated hydrocarbon that is substituted on at least one carbon atom with an amino group and on at least one other carbon atom with hydroxyalkyl or hydroxyl group, such as monoethanolamine, ethylaminoethanol, dimethylaminoethanol, isopropylaminoethanol, diethanolamine, triethanolamine, methylaminoethanol, aminopropanol, methylaminopropanol, dimethylaminopropanol, aminobutanol, dimethylaminobutanol, aminobutanediol, trihydroxymethylaminoethane, diethylaminopropanediol, 1-amino-cyclopentane methanol, and aminobenzyl alcohol, or a heterocyclic ring that comprises at least one nitrogen atom as a ring member and/or is substituted on at least one carbon atom with an amino group and that is substituted on at least one other carbon atom with a hydroxyalkyl or hydroxyl group, such as methylaminomethyl-1,3-dioxolane.

Suitable heterocyclic alcohol solvents include, for example, 5- or 6-membered heterocyclic rings that include 1 or 2 oxygen atoms as ring member, that are substituted on at least one carbon atom of the ring with a ($C_1$-$C_6$)hydroxyalkyl group, and that may optionally be substituted on one or more carbon atoms of the ring with one or more ($C_1$-$C_4$) alkyl groups. It is understood that the term heterocyclic alcohol includes dioxolane compounds. In one embodiment, the heterocyclic alcohol component of the present invention comprises a one or more compounds selected from heterocyclic alcohols according to formulas (II.c), (II.d), (II.e), (II.f), and (II.g):

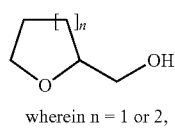

(II.c)

wherein n = 1 or 2,

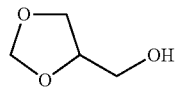

(II.d)

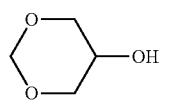

(II.e)

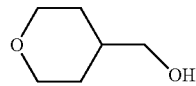

(II.f)

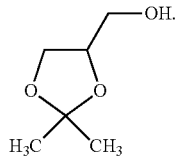

(II.g)

In one embodiment, the organic solvent component comprises one or more dibasic ester compounds according to any of formula (III) or formula (IV), one or more amino alcohols, one or more tertiary amines, one or more heterocyclic alcohols according to formulas (II.a-II.g), or mixtures thereof.

In one embodiment, the organic solvent component of the composition and methods of the present invention comprises dimethyl sulfoxide, dimethyl formamide, the dimethyl ester of succinic acid, dimethyl ester of ethyl succinic acid, the dimethyl ester of glutaric acid, the dimethyl ester of methyl glutaric acid, and the dimethyl ester of adipic acid, diethylene triamine, or monoethanolamine, methyl-5-(dimethylamino)-2-methyl-oxopentanoate, dimethylaminoethanol, triethanol amine, a heterocyclic alcohol according to any of formulas (II.a-II.g), or a mixture thereof.

In one embodiment, the organic solvent component of the composition and methods of the present invention comprises dimethyl sulfoxide, dimethyl formamide, diethylene triamine, monoethanolamine, or a mixture thereof.

In one embodiment, the organic solvent component of the composition and methods of the present invention comprises a mixture of at least one organophosphate solvent according to formula (I.a), wherein $R_1$, $R_2$ and $R_3$ are as described above, and dimethyl sulfoxide.

In one embodiment, a compound utilized as the solvent or as a component in the solvent blend is a compound of general formula (III):

$$R_3OOC\text{-}A\text{-}CONR_4R_5 \quad (III),$$

According to one embodiment, the expression "compound" denotes any compound corresponding to the general formula (III). In other embodiments, the term "compound" also refers to mixtures of several molecules corresponding to general formula (III). It may therefore be a molecule of formula (III) or a mixture of several molecules of formula (III), wherein both fall under the definition of the term "compound" when referring to formula (III).

The $R_3$, $R_4$ and $R_5$ groups can be, in some embodiments, identical or, in other embodiment, different. In one embodiment, may be groups chosen from $C_1$-$C_{20}$ alkyl, aryl, alkaryl or arylalkyl groups or the phenyl group. In another embodiment, may be groups chosen from $C_1$-$C_{12}$ alkyl, aryl, alkaryl or arylalkyl groups or the phenyl group. Mention is made especially of Rhodiasolv® PolarClean (Manufactured by Solvay USA Inc., Cranbury, N.J.). The $R_4$ and $R_5$ groups may optionally be substituted. In one particular embodiment, the groups are substituted with hydroxyl groups.

In one embodiment, $R_3$ group is chosen from methyl, ethyl, propyl, isopropyl, n-butyl, isobutyl, n-pentyl, isopentyl, isoamyl, n-hexyl, cyclohexyl, 2-ethylbutyl, n-octyl, isooctyl, 2-ethylhexyl, tridecyl groups.

$R_4$ and $R_5$ groups, which are identical or different, in one embodiment, may especially be chosen from methyl, ethyl, propyl (n-propyl), isopropyl, n-butyl, isobutyl, n-pentyl, amyl, isoamyl, hexyl, cyclohexyl or hydroxyethyl groups. The $R_4$ and $R_5$ groups may also be such that they form, together with the nitrogen atom, a morpholine, piperazine or piperidine group. According to some embodiments, $R_4$ and $R_5$ are each methyl, or $R_4$ and $R_5$ are each ethyl, or $R_4$ and $R_5$ are each hydroxyethyl.

According to one embodiment, if A comprises a linear group of formula —$CH_2$—$CH_2$— and/or of formula —$CH_2$—$CH_2$—$CH_2$—$CH_2$— and/or of formula —$(CH_2)_8$— then it is a mixture of A groups. According to one particular embodiment, if A is linear, then it is a mixture of A groups, for example a mixture of two or three —$CH_2$—$CH_2$— (ethylene); —$CH_2$—$CH_2$—$CH_2$— (n-propylene); and —$CH_2$—$CH_2$—$CH_2$—$CH_2$— (n-butylene) groups (or isomers thereof).

According to a first particular embodiment of the invention, the A group is a divalent linear alkyl group chosen from the groups of the following formulae: —$CH_2$—$CH_2$— (ethylene); —$CH_2$—$CH_2$—$CH_2$— (n-propylene); —$CH_2$—$CH_2$—$CH_2$—$CH_2$— (n-butylene), and mixtures thereof.

In one embodiment, the inhibitor composition of the present invention comprises, based on 100 parts by weight ("pbw") of the composition:

from about 4 to about 60 pbw, more typically from about 10 to about 55 pbw, and even more typically from about 20 to about 40 pbw dicyandiamide, and from about 55 to about 96 pbw, more typically from about 58 to about 90 pbw, and even more typically from about 60 to about 80 pbw of the organic solvent.

In one embodiment, the inhibitor composition of the present invention comprises one or more urease inhibitors, such as, for example, NBPT or ammonium thiosulfate.

The nitrogenous fertilizer compound is treated with the inhibitor composition by contacting the nitrogenous fertilizer composition with the inhibitor composition described herein (e.g., nitrification inhibitor or urease inhibitor or a combination of both). The nitrogenous fertilizer composition may be in solid or liquid form.

Suitable nitrogenous fertilizers are those containing a nitrogenous compound such as urea, nitrate salts, ammonium salt, or a mixture thereof, such as ammonium nitrate, ammonium sulfate, ammonium thiosulfate, ammonium polysulfide, ammonium phosphates, ammonium chloride, ammonium bicarbonate, anhydrous ammonia, calcium nitrate, nitrate soda, calcium cyanamide. In one embodiment, the nitrogenous fertilizer comprises ammonium nitrate. Suitable ammonium nitrate-containing fertilizers include, for example, UAN 18, UAN 28, and UAN 30.

In one embodiment, the nitrogenous fertilizer composition is in solid particulate form, and the contacting of the nitrogenous fertilizer composition with the inhibitor composition is conducted by, for example, spraying the composition of the present invention on the particles of solid fertilizer composition.

In one embodiment, the concentrated fertilizer composition of the present invention is a solid nitrification-inhibited fertilizer composition that comprises, based on 100 pbw of the composition:

from about 60 pbw to about 99.999, more typically from about 70 pbw to about 99.999, and even more typically from about 80 pbw to about 99.999 solid particles of one or more nitrogenous fertilizer compounds, and from about 0.001 to about 40 pbw, more typically from about 0.001 to about 30 pbw, and even more typically from about 0.001 to about 20 pbw, dicyandiamide.

In one embodiment, the solid nitrification-inhibited fertilizer composition of the present invention further comprises one or more urease inhibitors, more typically NBPT.

In one embodiment, the end use fertilizer composition of the present invention is made by combining the inhibitor composition of the present invention with a solid nitrogenous fertilizer to form a solid nitrification-inhibited fertilizer composition and subsequently dissolving the solid nitrification-inhibited fertilizer composition in an aqueous medium, typically water, in a ratio of up to about 500 pbw, more typically from 100 to 500 pbw and even more typically from about 100 to about 300 pbw, of the aqueous medium per 1 pbw of the solid nitrification-inhibited fertilizer composition.

In one embodiment, the fertilizer compound is in liquid form and the contacting of the fertilizer composition with the inhibitor composition is conducted by mixing the inhibitor composition with the liquid fertilizer composition.

In one embodiment, the concentrated fertilizer composition of the present invention is a concentrated liquid nitrification-inhibited fertilizer composition that comprises, based on 100 pbw of the composition:

from about 20 to about 99.989 pbw, more typically from about 30 to about 99.985 pbw, and even more typically from about 40 to about 99.98 pbw of one or more nitrogenous fertilizer compounds, from about 0.001 to 40 pbw, more typically from about 0.005 to 30 pbw, and even more typically from about 0.01 to 20 pbw NBPT (or NBPT in combination with DCD), and from about 0.01 to 60 pbw, more typically from about 0.01 to about 40 pbw, and even more typically from about 0.01 to about 30 pbw of the organic solvent or solvent mixture, as described herein.

In one embodiment, the concentrated liquid nitrification-inhibited fertilizer composition of the present invention further comprises one or more urease inhibitors, more typically NBPT.

In one embodiment, the end use fertilizer composition of the present invention is made by combining the inhibitor composition of the present invention with a concentrated nitrogenous fertilizer to form a concentrated liquid nitrification-inhibited fertilizer composition and subsequently diluting the concentrated liquid nitrification-inhibited fertilizer composition with an aqueous medium, typically water in a ratio of up to about 500 pbw, more typically from about 10 to about 500 pbw and even more typically from about 100 to about 300 pbw, of the aqueous medium per 1 pbw concentrated liquid nitrogenous fertilizer composition.

In one embodiment, the end use fertilizer composition of the present invention is made by combining the inhibitor composition of the present invention, a solid or concentrated liquid nitrogenous fertilizer, and an aqueous medium.

In one embodiment, the end use fertilizer composition of the present invention is an aqueous liquid composition that comprises water, one or more nitrogenous fertilizer compounds, and dicyandiamide, typically in an amount of from $2 \times 10^{-6}$ pbw to about 4 pbw dicyandiamide per 100 pbw of the end use fertilizer composition.

In one embodiment, the end use fertilizer composition of the present invention comprises water and based on 100 parts by weight of the composition:

from about 0.04 to about 10 pbw, more typically from about 0.06 to about 10 pbw, and even more typically from about 0.08 pbw to about 10 pbw to of one or more nitrogenous fertilizer compounds, from about $2 \times 10^{-6}$ to about 4 pbw, more typically from about $1 \times 10^{-5}$ to about 3 pbw, and even more typically from about $2 \times 10^{-4}$ to about 2 pbw dicyandiamide, and from about $2 \times 10^{-4}$ to about 6 pbw, more typically from about $2 \times 10^{-4}$ to about 4 pbw, and even more typically from about $2 \times 10^{-4}$ to about 3 pbw of the organic solvent.

In one embodiment, the end use fertilizer composition of the present invention comprises one or more urease inhibitors, more typically NBPT, alone or in combination with the nitrification inhibitor.

In one embodiment, the end use fertilizer composition of the present invention comprises from about 0.001 to about 5 pbw, more typically from about 0.01 to about 2 pbw dicyandiamide per 100 pbw of the one or more nitrogenous fertilizer compounds.

In one embodiment, the end use fertilizer composition is applied to target plants or to an environment for the target plants, i.e., to ground on or within which the target plants are growing or to be grown, at a rate of from about 0.01 pounds to about 5 pounds of the fertilizer composition, more typically from about 0.05 pounds to about 2 pounds of the fertilizer composition, per 100 square feet of ground.

In one embodiment, the end use fertilizer composition is applied to target plants or to an environment for the target plants at a rate effective to provide a dosage of nitrogenous fertilizer compound of from about 0.01 pounds to about 5 pounds of fertilizer compound, more typically from about 0.05 pounds to 2 pounds of fertilizer compound, per 100 square feet of ground.

In one embodiment, the end use fertilizer composition is applied to target plants or to an environment for the target plants at a rate effective to provide a dosage of dicyandiamide of from about 0.01 pounds to 5 pounds of dicyandiamide, more typically from about 0.05 pounds to 2 pounds of dicyandiamide, per 1000 square feet of ground.

The composition of the present invention provides improved ease of handling of dicyandiamide, improved solubility characteristics, low toxicity of the organic solvents; good storage characteristics, and excellent miscibility with aqueous compositions, such as aqueous nitrogenous fertilizer formulations.

In one embodiment the composition comprises, by weight of composition, greater than 50 wt % of DCD and/or NBPT, the remainder being solvent or a mixture of solvents with the amine stabilizer. By way of example, in one embodiment, the fertilizer composition comprises, by weight of composition, 50 wt % of DCD and 50 wt % of a solvent blend of DMSO and at least one amine stabilizer as described above.

In one embodiment the composition comprises, by weight of composition, greater than 50 wt % of NBPT, the remainder being solvent or a mixture of solvents with the amine stabilizer. In one embodiment the composition comprises, by weight of composition, greater than 51 wt %, 52 wt %, 53 wt %, 54 wt % of NBPT, the remainder being solvent or a mixture of solvents with the amine stabilizer. In one embodiment the composition comprises, by weight of composition, greater than 55 wt %, 56 wt %, 57 wt %, 58 wt %, 59 wt % of NBPT, the remainder being solvent or a mixture of solvents with the amine stabilizer. In one embodiment the composition comprises, by weight of composition, greater than 60 wt % of NBPT, the remainder being solvent or a mixture of solvents with the amine stabilizer. In one embodiment the composition comprises, by weight of composition, greater than 65 wt % of NBPT, the remainder being solvent or a mixture of solvents with the amine stabilizer. In one embodiment the composition comprises, by weight of composition, greater than 70 wt % of NBPT, the remainder being solvent or a mixture of solvents with the amine stabilizer. In one embodiment the composition comprises, by weight of composition, greater than 75 wt % of NBPT, the remainder being solvent or a mixture of solvents with the amine stabilizer.

In one embodiment the composition comprises, by weight of composition, greater than 50 wt % of NBPT in combination with DCD, the remainder being solvent or a mixture of solvents with the amine stabilizer. In one embodiment the composition comprises, by weight of composition, greater than 51 wt %, 52 wt %, 53 wt %, 54 wt % of NBPT in combination with DCD, the remainder being solvent or a mixture of solvents with the amine stabilizer. In one embodiment the composition comprises, by weight of composition, greater than 55 wt %, 56 wt %, 57 wt %, 58 wt %, 59 wt % of NBPT in combination with DCD, the remainder being solvent or a mixture of solvents with the amine stabilizer. In one embodiment the composition comprises, by weight of composition, greater than 60 wt % of NBPT in combination with DCD, the remainder being solvent or a mixture of solvents with the amine stabilizer. In one embodiment the composition comprises, by weight of composition, greater than 65 wt % of NBPT in combination with DCD, the remainder being solvent or a mixture of solvents with the amine stabilizer. In one embodiment the composition comprises, by weight of composition, greater than 70 wt % of NBPT in combination with DCD, the remainder being solvent or a mixture of solvents with the amine stabilizer. In one embodiment the composition comprises, by weight of composition, greater than 75 wt % of NBPT in combination with DCD, the remainder being solvent or a mixture of solvents with the amine stabilizer.

In one embodiment the composition comprises, by weight of composition, greater than 30 wt % of DCD and/or NBPT, the remainder being solvent or a mixture of solvents with the amine stabilizer. By way of example, in one embodiment, the fertilizer composition comprises, by weight of composition, 30 wt % of DCD and 70 wt % of a solvent blend of:
(i) at least one dioxolane compound of formula (II.b):

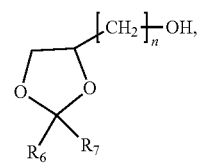

(II.b)

wherein $R_6$ and $R_7$ individually comprises a hydrogen, an alkyl group, an alkenyl group, or a phenyl group, wherein n is an integer of from 1 to 10.

In one embodiment the composition comprises, by weight of composition, greater than 40 pbw of NBPT (or NBPT in combination with DCD), the remainder being solvent or a mixture of solvents.

In one embodiment the composition comprises, by weight of composition, greater than 35 pbw of NBPT (or NBPT in combination with DCD), the remainder being solvent or a mixture of solvents.

In one embodiment the composition comprises, by weight of composition, greater than 45 pbw of DCD and/or NBPT, the remainder being solvent or a mixture of solvents. By way of example, in one embodiment, the fertilizer composition comprises, by weight of composition, 45 wt % of DCD and 55 wt % of a solvent blend of:
(i) at least one dioxolane compound of formula (II.b) or formula (II.a), wherein $R_6$ and $R_7$ are as described above; and
(ii) at least one amine stabilizer as described herein.

In one embodiment the composition comprises, by weight of composition, greater than 55 pbw of DCD and/or NBPT, the remainder being solvent or a mixture of solvents. By way of example, in one embodiment, the fertilizer composition comprises, by weight of composition, 55 wt % of DCD and 45 wt % of a solvent blend of:
(i) at least one dioxolane compound of formula (II.b) or formula (II.a), wherein $R_6$ and $R_7$ are as described above; and
(ii) at least one amine stabilizer as described herein.

EXPERIMENTS

Referring to FIG. 1, Several amines or amides were tested to check if they can stabilize NBPT degradation at high temperatures (at greater than 45° C.) in NBPT/DMSO formulation. Each sample was prepared with 2 wt % of amine stabilizer added. From visual observation, samples prepared with monoethanolamine showed better physical stability (less dark appearance), which is believed to be as a result of less formation of dimethyl sulfide (degradation product from solvent).

Figure 2:
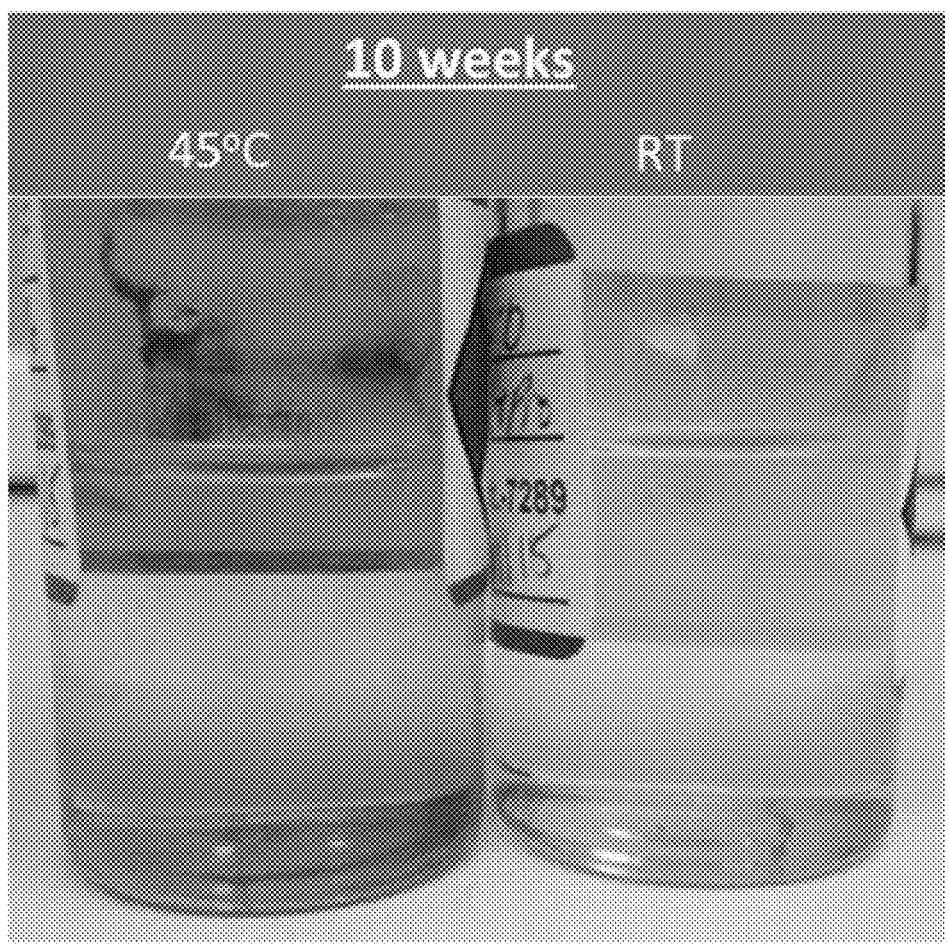
FIG. 2 is a photograph showing the results from 10 weeks storage of 2% monoethanolamine in 1:1 NBPT:DMSO at two different temperatures, 45° C. and Room Temperature (20° C.).

Referring to FIG. 2, the photograph shows the results from 10 weeks storage of 2% monoethanolamine in 1:1 NBPT:DMSO at two different temperatures, 45° C. and Room Temperature, "RT" (20° C.).

Figure 3:
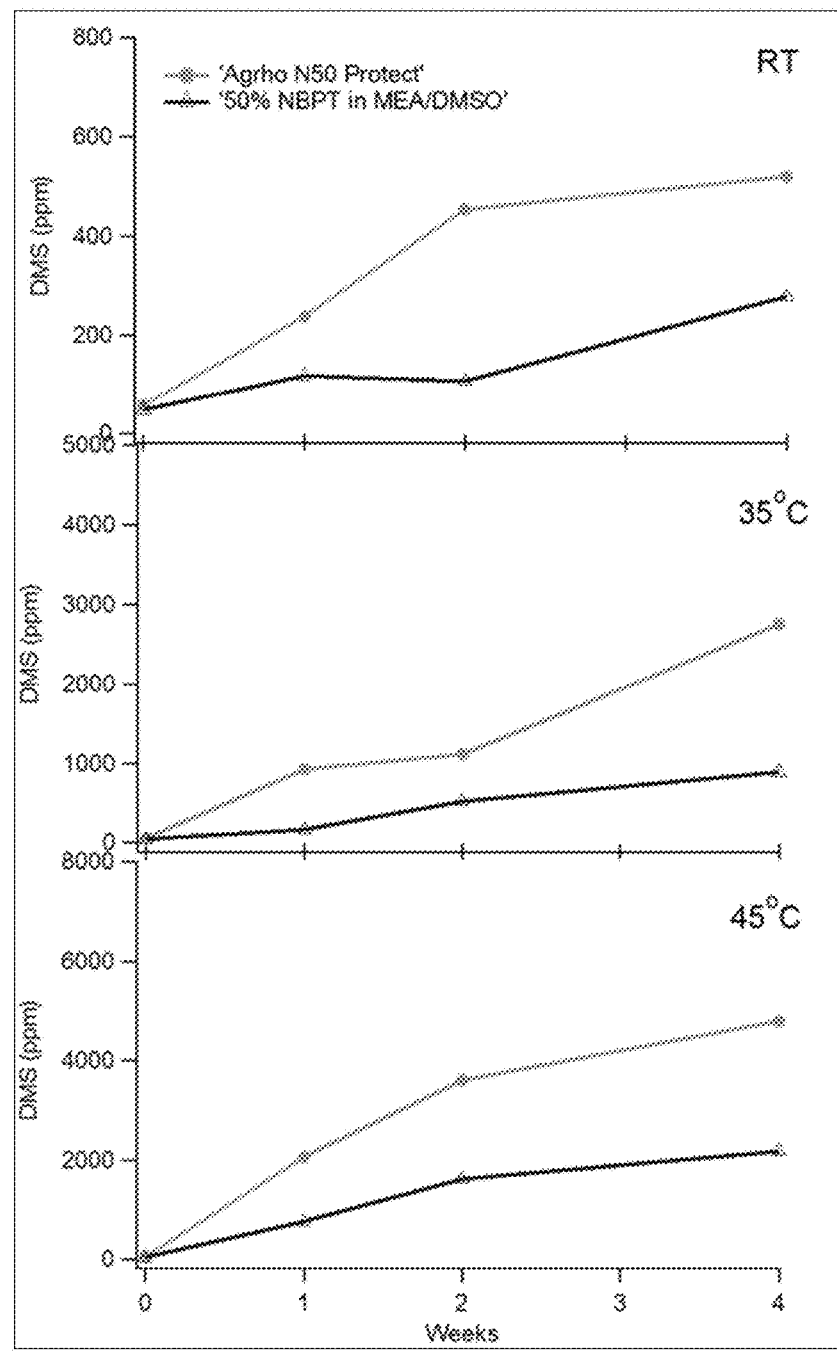
FIG. 3. is a chart of the degradation product, i.e., dimethyl sulfide (DMS) in parts per million (ppm), measured at varying high temperatures for a period of weeks. The results indicate the liquid fertilizer composition with the amine stabilizer exhibited higher stability over time versus a liquid fertilizer composition without the stabilizer.

Referring to FIG. 3, it shows a chart of the degradation product, i.e., dimethyl sulfide (DMS) in parts per million (ppm), measured at varying high temperatures for a period of weeks. The results indicate the liquid fertilizer composition with the amine stabilizer exhibited higher stability over time versus a liquid fertilizer composition without the stabilizer.

What is claimed is:

1. A high temperature stable liquid agricultural composition comprising:
   urease inhibitor, wherein the urease inhibitor is N-(n-butyl)-thiophosphoric triamide (NBPT);
   dimethylsulfoxide;
   amine stabilizer, wherein the amine stabilizer is monoethanolamine;
   optionally at least one solvent selected from the group consisting of:
   (a) at least one dioxolane compound of formula (I.b):

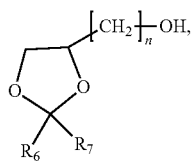

(Ia)

wherein $R_6$ and $R_7$ individually comprises a hydrogen, an alkyl group, an alkenyl group, or a phenyl group, wherein n is an integer of from 1 to 10;
b) at least one dibasic ester;
c) at least one compound of formula (III):

$$R_3OOC-A-CONR_4R_5 \quad (III),$$

wherein $R_3$ comprises a $C_1$-$C_{36}$ alkyl group; wherein $R_4$ and $R_5$ individually comprise a $C_1$-$C_{36}$ alkyl group, wherein $R_4$ and $R_5$ can optionally together form a ring; and wherein A is a linear or a branched divalent $C_2$-$C_6$ alkyl group;
d) at least one alkyldimethylamide;
e) at least one alkyl lactate;
f) ethyl levulinate;
g) at least one alkoxyalcohol, ether alcohol, or alcohol;
h) at least one glycerine or glycerine derivative;
i) at least one alkylene carbonate; and
j) organophosphate of formula (I.a):

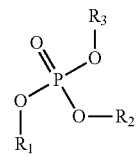

(I.a)

wherein $R_1$, $R_2$ and $R_3$, are each independently chosen from a $C_1$-$C_{16}$ alkyl group, a $C_1$-$C_{16}$ alkenyl, group, a $C_1$-$C_{16}$ alkoxyalkyl group, a $C_7$-$C_{30}$ alkylarylalkyl group, a $C_7$-$C_{30}$ arylalkyl group, or an aryl group; and wherein the stable liquid agricultural composition comprises:
   between 45 and 55 wt. % N-(n-butyl)-thiophosphoric triamide (NBPT) urease inhibitor,
   at least 2 to less than 3 wt. % monoethanolamine; and
   a remainder, wherein the remainder consists of the dimethylsulfoxide and, if present, the at least one solvent.

2. The liquid agricultural composition of claim 1, wherein the stable liquid agricultural composition consists of:
   between 45 wt. % and 55 wt % N-(n-butyl)-thiophosphoric triamide (NBPT),
   at least 2 to less than 3 wt. % monoethanolamine;
   the dimethylsulfoxide;
   optionally the at least one solvent.

3. The liquid agricultural composition of claim 1, wherein the stable liquid agricultural composition consists of:
   between 45 wt. % and 55 wt. % N-(n-butyl)-thiophosphoric triamide (NBPT),
   at least 2 to less than 3 wt. % monoethanolamine; and
   the dimethylsulfoxide.

4. The liquid agricultural composition of claim 1, wherein the at least one solvent is present and consists of at least one dioxolane compound of formula (II.b):

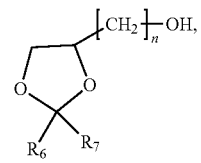

(II.b)

wherein $R_6$ and $R_7$ individually is a hydrogen, an alkyl group, an alkenyl group, or a phenyl group, wherein n is an integer of from 1 to 10.

5. The liquid agricultural composition of claim 1, wherein the N-(n-butyl)-thiophosphoric triamide (NBPT) is present in an amount between 45 wt. % and 50 wt. %, by total weight of composition.

6. The liquid agricultural composition of claim 1, wherein the at least one solvent is present and comprises the organophosphate of formula (I.a):

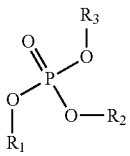

(I.a)

wherein $R_1$, $R_2$ and $R_3$, are each independently chosen from a $C_1$-$C_{16}$ alkyl group, a $C_1$-$C_{16}$ alkenyl, group, a $C_1$-$C_{16}$ alkoxyalkyl group, a $C_7$-$C_{30}$ alkylarylalkyl group, a $C_7$-$C_{30}$ arylalkyl group, or an aryl group.

7. A concentrated liquid fertilizer composition comprising, based on 100 parts by weight of the composition:
(a) up to about 99 parts by weight of one or more nitrogenous fertilizer compounds, and
(b) the high temperature stable liquid agricultural composition of claim 1.

8. The concentrated liquid fertilizer composition of claim 7 wherein at least one said solvent is:
at least one dioxolane compound of formula (II.b):

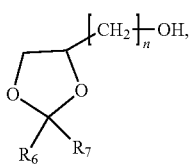

(II.b)

wherein $R_6$ and $R_7$ individually comprises a hydrogen, an alkyl group, an alkenyl group, or a phenyl group, wherein n is an integer of from 1 to 10.

9. The concentrated liquid fertilizer composition of claim 7, wherein at least one said solvent is:
at least one dioxolane compound of formula (II.b)

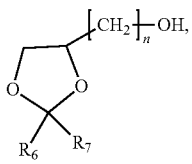

(II.b)

wherein $R_6$ and $R_7$ individually comprises a hydrogen, an alkyl group, an alkenyl group, or a phenyl group, wherein n is an integer of from 1 to 10; and
organophosphate of formula (I.a):

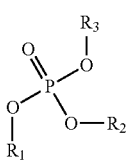

(I.a)

wherein $R_1$, $R_2$ and $R_3$, are each independently chosen from a $C_1$-$C_{16}$ alkyl group, a $C_1$-$C_{16}$ alkenyl, group, a $C_1$-$C_{16}$ alkoxyalkyl group, a $C_7$-$C_{30}$ alkylarylalkyl group, a $C_7$-$C_{30}$ arylalkyl group, or an aryl group.

10. The concentrated liquid fertilizer composition of claim 7 wherein at least one said solvent is organophosphate of formula (I.a):

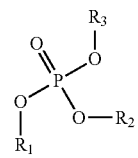

(I.a)

wherein $R_1$, $R_2$ and $R_3$, are each independently chosen from a $C_1$-$C_{16}$ alkyl group, a $C_1$-$C_{16}$ alkenyl, group, a $C_1$-$C_{16}$ alkoxyalkyl group, a $C_7$-$C_{30}$ alkylarylalkyl group, a $C_7$-$C_{30}$ arylalkyl group, or an aryl group.

11. A method of making a solid or concentrated liquid fertilizer composition comprising contacting one or more nitrogenous fertilizer compounds with a liquid inhibitor composition that comprises
urease inhibitor, wherein the urease inhibitor is N-(n-butyl)-thiophosphoric triamide (NBPT), which is dissolved in a liquid medium comprising dimethylsulfoxide;
amine stabilizer, wherein the amine stabilizer is monoethanolamine;
optionally at least one solvent selected from the group consisting of:
(a) at least one dioxolane compound of formula (II.b):

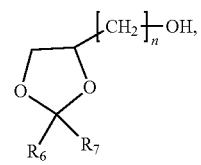

(II.b)

wherein $R_6$ and $R_7$ individually comprises a hydrogen, an alkyl group, an alkenyl group, or a phenyl group, wherein n is an integer of from 1 to 10;
b) at least one dibasic ester;
c) at least one compound of formula (III):

$$R_3OOC\text{-}A\text{-}CONR_4R_5 \quad (III),$$

wherein $R_3$ comprises a $C_1$-$C_{36}$ alkyl group; wherein $R_4$ and $R_5$ individually comprise a $C_1$-$C_{36}$ alkyl group, wherein $R_4$ and $R_5$ can optionally together form a ring; and wherein A is a linear or a branched divalent $C_2$-$C_6$ alkyl group;
d) at least one alkyldimethylamide;
e) at least one alkyl lactate;
f) ethyl levulinate;
g) at least one alkyoxyalcohol, ether alcohol, amine alcohol, amino alcohol or alcohol;
h) at least one glycerine or glycerine derivative;
i) at least one alkylene carbonate; and
j) organophosphate of formula (I.a):

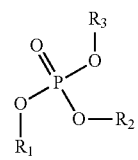

(I.a)

wherein $R_1$, $R_2$ and $R_3$, are each independently chosen from a $C_1$-$C_{16}$ alkyl group, a $C_1$-$C_{16}$ alkenyl, group, a $C_1$-$C_{16}$ alkoxyalkyl group, a $C_7$-$C_{30}$ alkylarylalkyl group, a $C_7$-$C_{30}$ arylalkyl group, or an aryl group; and wherein the liquid inhibitor composition comprises between 45 wt. % and 55 wt. % N-(n-butyl)-thiophosphoric triamide (NBPT) urease inhibitor, at least 2 to less than 3 wt. % said monoethanolamine; and a remainder consisting of the dimethylsulfoxide and, if present, the at least one solvent.

12. The method of claim 11, wherein the solvent comprises at least one member of the group consisting of organophosphate of formula (I.a):

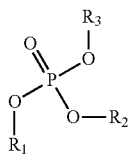

(I.a)

wherein $R_1$, $R_2$ and $R_3$, are each independently chosen from a $C_1$-$C_{16}$ alkyl group, a $C_1$-$C_{16}$ alkenyl, group, a $C_1$-$C_{16}$ alkoxyalkyl group, a $C_7$-$C_{30}$ alkylarylalkyl group, a $C_7$-$C_{30}$ arylalkyl group, or an aryl group and at least one dioxolane compound of formula (II.b):

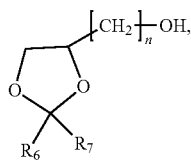

(II.b)

wherein $R_6$ and $R_7$ individually comprises a hydrogen, an alkyl group, an alkenyl group, or a phenyl group, wherein n is an integer of from 1 to 10.

13. The method of claim 11, wherein the liquid inhibitor composition consists of:
between 45 and 55 wt. % N-(n-butyl)-thiophosphoric triamide (NBPT) urease inhibitor, at least 2 to less than 3 wt. % monoethanolamine; and dimethylsulfoxide.

14. The method of claim 11, wherein the at least one solvent, if present, is selected from the group consisting of:
(a) at least one dioxolane compound of formula (II.b):

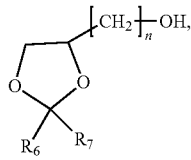

(II.b)

wherein $R_6$ and $R_7$ individually comprises a hydrogen, an alkyl group, an alkenyl group, or a phenyl group, wherein n is an integer of from 1 to 10;
b) at least one dibasic ester;
c) at least one compound of formula (III):

wherein $R_3$ comprises a $C_1$-$C_{36}$ alkyl group; wherein $R_4$ and $R_5$ individually comprise a $C_1$-$C_{36}$ alkyl group, wherein $R_4$ and $R_5$ can optionally together form a ring; and wherein A is a linear or a branched divalent $C_2$-$C_6$ alkyl group;
d) at least one alkyldimethylamide;
e) at least one alkyl lactate;
f) ethyl levulinate;
g) at least one alkyoxyalcohol or ether alcohol;
h) at least one glycerine or glycerine derivative;
i) at least one alkylene carbonate; and
j) organophosphate of formula (I.a):

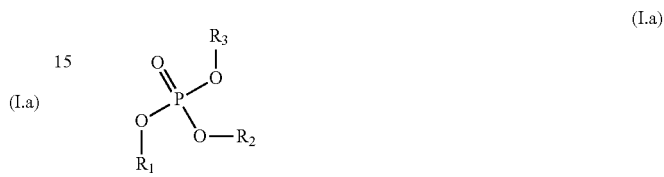

(I.a)

wherein $R_1$, $R_2$ and $R_3$, are each independently chosen from a $C_1$-$C_{16}$ alkyl group, a $C_1$-$C_{16}$ alkenyl, group, a $C_1$-$C_{16}$ alkoxyalkyl group, a $C_7$-$C_{30}$ alkylarylalkyl group, a $C_7$-$C_{30}$ arylalkyl group, or an aryl group.

15. A method of stabilizing a liquid fertilizer composition at high temperatures comprising contacting one or more nitrogenous fertilizer compounds with
a liquid urease inhibitor composition that comprises urease inhibitor, wherein the urease inhibitor is N-(n-butyl)-thiophosphoric triamide (NBPT), dissolved in a liquid medium comprising:
amine stabilizer, wherein the amine stabilizer is monoethanolamine;
dimethylsulfoxide; and
optionally at least one solvent selected from the group consisting of:
(a) at least one dioxolane compound of formula (II.b):

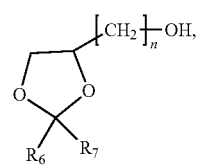

(II.b)

wherein $R_6$ and $R_7$ individually comprises a hydrogen, an alkyl group, an alkenyl group, or a phenyl group, wherein n is an integer of from 1 to 10;
b) at least one dibasic ester;
c) at least one compound of formula (III):

wherein $R_3$ comprises a $C_1$-$C_{36}$ alkyl group; wherein $R_4$ and $R_5$ individually comprise a $C_1$-$C_{36}$ alkyl group, wherein $R_4$ and $R_5$ can optionally together form a ring; and wherein A is a linear or a branched divalent $C_2$-$C_6$ alkyl group;
d) at least one alkyldimethylamide;
e) at least one alkyl lactate;
f) ethyl levulinate;
g) at least one alkyoxyalcohol, ether alcohol, amine alcohol, amino alcohol or alcohol;
h) at least one glycerine or glycerine derivative;
i) at least one alkylene carbonate; and j) organophosphate of formula (I.a):

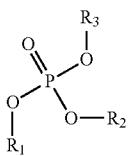
(I.a)

wherein $R_1$, $R_2$ and $R_3$, are each independently chosen from a $C_1$-$C_{16}$ alkyl group, a $C_1$-$C_{16}$ alkenyl, group, a $C_1$-$C_{16}$ alkoxyalkyl group, a $C_7$-$C_{30}$ alkylarylalkyl group, a $C_7$-$C_{30}$ arylalkyl group, or an aryl group;

wherein the liquid urease inhibitor composition comprises between 45 and 55 wt. % N-(n-butyl)-thiophosphoric triamide (NBPT);

at least 2 to less than 3 wt. % monoethanolamine; and a remainder consisting of the dimethylsulfoxide and, if present, the at least one solvent.

16. The method of claim 15, wherein the liquid inhibitor composition consists of between 45 and 55 wt. % N-(n-butyl)-thiophosphoric triamide (NBPT) urease inhibitor, at least 2 to less than 3 wt. % monoethanolamine;

dimethylsulfoxide; and optionally the at least one solvent.

17. The method of claim 15, wherein the inhibitor composition consists of:

between 45 and 55 wt. % N-(n-butyl)-thiophosphoric triamide (NBPT) urease inhibitor, at least 2 to less than 3 wt. % monoethanolamine; and dimethylsulfoxide.

18. The method of claim 15, wherein the N-(n-butyl)-thiophosphoric triamide (NBPT) is present in an amount between 45 wt. % and 50 wt. % by weight of the liquid inhibitor composition.

19. The method of claim 15, wherein the at least one solvent, if present, is selected from the group consisting of:

(a) at least one dioxolane compound of formula (II.b):

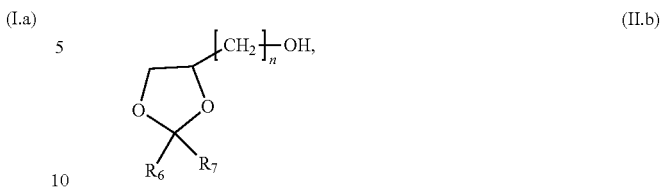
(II.b)

wherein $R_6$ and $R_7$ individually comprises a hydrogen, an alkyl group, an alkenyl group, or a phenyl group, wherein n is an integer of from 1 to 10;

b) at least one dibasic ester;

c) at least one compound of formula (III):

$$R_3OOC-A-CONR_4R_5 \qquad (III),$$

wherein $R_3$ comprises a $C_1$-$C_{36}$ alkyl group; wherein $R_4$ and $R_5$ individually comprise a $C_1$-$C_{36}$ alkyl group, wherein $R_4$ and $R_5$ can optionally together form a ring; and wherein A is a linear or a branched divalent $C_2$-$C_6$ alkyl group;

d) at least one alkyldimethylamide;

e) at least one alkyl lactate;

f) ethyl levulinate;

g) at least one alkyoxyalcohol or ether alcohol;

h) at least one glycerine or glycerine derivative;

i) at least one alkylene carbonate; and j) organophosphate of formula (I.a):

(I.a)

wherein $R_1$, $R_2$ and $R_3$, are each independently chosen from a $C_1$-$C_{16}$ alkyl group, a $C_1$-$C_{16}$ alkenyl, group, a $C_1$-$C_{16}$ alkoxyalkyl group, a $C_7$-$C_{30}$ alkylarylalkyl group, a $C_7$-$C_{30}$ arylalkyl group, or an aryl group.

* * * * *